Patented Apr. 17, 1945

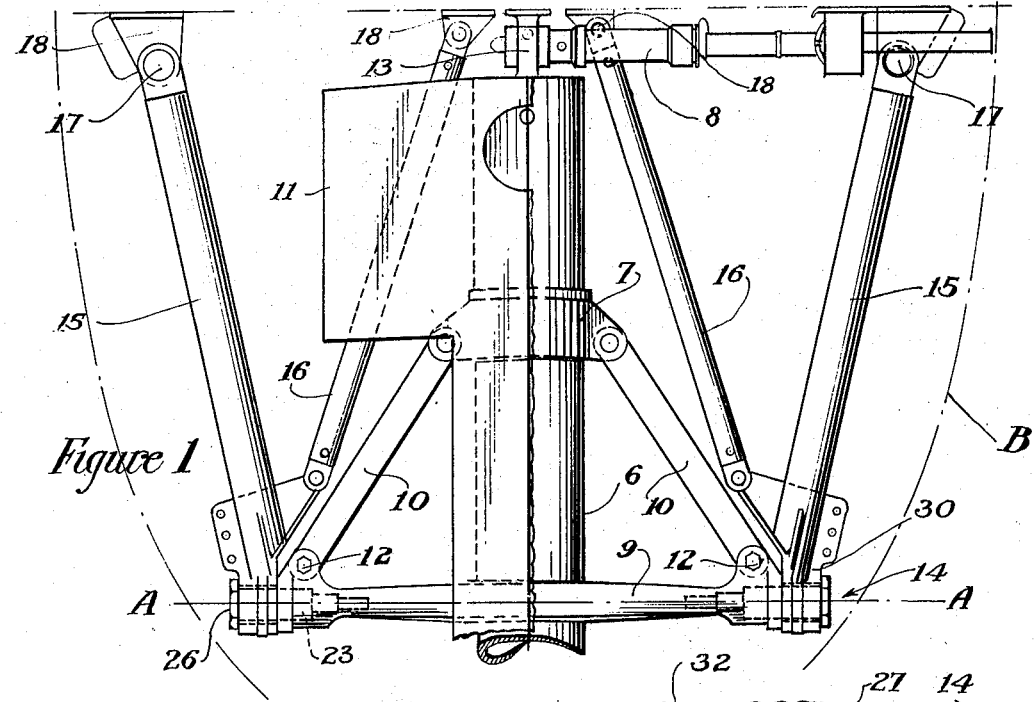

2,373,860

UNITED STATES PATENT OFFICE 2,373,860

BEARING

Carel T. Torresen, Santa Monica, Calif., assignor to North American Aviation, Inc., Inglewood, Calif., a corporation of Delaware Application December 24, 1940, Serial No. 371,489

11 Claims. (Cl. 244—102)

The present invention relates to bearings and more particularly to improvements in composite bearings in which the lighter anti-friction elements are supplemented or replaced upon the application of higher loads.

In bearing installations it is frequently necessary to provide for a wide range of magnitudes of radial loads, and in which the load requirements of the anti-friction bearing under normal rotating conditions is relatively light but are so greatly exceeded by intermittent loads due to impacts or other shocks as to cause failure and require replacement of the anti-friction elements. Such conditions are met with in the hinge pins and bearings of the landing gears of aircraft wherein the impacts and shocks due to landing are far in excess of the normal running or rotational loads.

The present invention provides a satisfactory solution to problems produced by these and similar conditions and comprises essentially a combination unitary bearing consisting of flexible roller elements, for the normal light duty, which floatingly carry a solid bushing or plain bearing element which comes into play upon the application of forces of a predetermined magnitude. A number of dual bearing and safety arrangements have heretofore been proposed for purposes of assisting or preventing damage to anti-friction elements or the journalled parts, but the composite bearing of the present invention presents a more satisfactory solution under many operating conditions than has heretofore been found possible.

It is accordingly an object of the present invention to provide a composite bearing having an anti-friction element which functions under normal or light operation, and a plain bearing element which serves to relieve the anti-friction element when subjected to stresses in excess of those of a predetermined magnitude. It is also an object to provide an arrangement in which the bearing can be kept in service for longer periods without the necessity of frequent inspection and replacement. It is a further object to provide a unitary bearing comprised of anti-friction and plain bearing elements which have fixed predetermined characteristics which are not disturbed or put out of adjustment. It is also an object to provide such a unitary bearing which is readily installed or replaced as a simple, compact and light unit and which is also economically produced.

Another object is the provision of such a bearing for aircraft landing gears, which is unusually quiet in operation for the reason that continual contact is maintained between both the fixed and rotating member. This prevents clearance rattles, radio static and interferences which usually result from contact being made and broken between the two relatively moving bearing parts.

Other objects and advantages may occur to those skilled in the art after a reading of this specification and the attached drawing forming a part hereof, and are all intended to come within the scope and spirit of the present invention.

In the drawing:

Fig. 1 shows a front elevation of the upper portion of a retractable landing gear in which my improved bearing has been incorporated;

Fig. 2 shows a detailed sectional view of the parts of the present bearing;

Fig. 3 shows a portion of the improved bearing under normal rotational load;

Fig. 4 shows the same portion of the bearing under impact load; and

Fig. 5 is a longitudinal cross section of the bearing in its normal condition as taken along the lines 5—5 of Fig. 3.

Referring now to Fig. 1, there is shown the upper portion of a retractable landing gear comprising a main shock absorbing strut 6 provided with a supporting fitting 7 and a locking device 8 for the prevention of its retraction during operation. This figure is taken looking rearwardly of the aircraft and for the sake of clarity half of the fairing 11 has been shown removed. The main oleo strut 6 is adapted to be rotated for retraction about the axis A—A of the transverse trunnion member 9, the ends of which are braced from the fitting 7 by the struts 10, being suitably fixed thereto by the attachment bolts 12. The outer ends of the trunnion or swivel member are pivotally journalled by means of the hinge pin bearing assemblies 14 at the lower extremities of the braces 15 and 16. The latter are in turn fixedly mounted at their upper extremities by the attachment bolts and fittings 17 and 18 respectively, to the structural framework of the aircraft.

The arrangement just described is shown by way of example only as being typical of a structure to which the improved bearing of this invention is applicable. In the retractable landing gear shown the strut 6 is preferably provided with a wheel or other ground engaging member at its lower or piston portion and is further provided with oleo or other shock absorbing means to resiliently oppose telescoping of the upper and lower members in a manner well known in the art. Suitable means such as a torque scissors or nut cracker link is also provided to prevent relative rotation of the wheel-carrying member with respect to the upper member while at the same time permitting telescopic movement. The upper landing gear parts, as shown in Fig. 1, are in the landing or operating position and in order to be retracted the locking pin 8 is withdrawn from the apertured fitting 13 at the top of the strut 6 and the upper portion rotated forwardly and downwardly by suitable actuating means about the transverse horizontal axis A—A. In the fully retracted position the strut 6 would lie substantially horizontally in which the fairing 11 closes the opening in the bottom of the nacelle or body B.

Referring now to Fig. 2 it will be seen that the trunnion 9 is suitably bored to different or stepped diameters at 20 and 21 each concentrically arranged with respect to the longitudinal axis A—A of the swivel. The inner portion of the bored opening 21 is suitably threaded at 22 to receive a similarly threaded portion of the hinge pin or stub axle 23. The stub shaft 23 is further provided with an enlarged cylindrical portion 23—24 and an inner portion of reduced diameter 25 which carries on its inner end the aforementioned threads 22. The hinge pin 23 is further provided at its outer end with an integral hexagonal head or nut 26 by which the pin is threadedly engaged with the swivel member 9, or released therefrom. The head portion 26 also serves as a retainer for the ring washer 27 and the composite bearing 28. The bearing unit 28 is preferably composed of a solid annular bushing 29, of a thickness which is slightly less in dimension than that of the annular space between the cylindrical outer portion 24 of the stub shaft 23 and the inside diameter 19 of the journal fitting 30. This provides a predetermined clearance on both sides of the bushing under normal rotative loads to permit an easy running fit. The solid bushing 29 is provided at its outer edges with a plurality of rectangular openings 31 extending both longitudinally and radially through its thickness, and in which are carried the flexible helix roller bearing units 32. The flexible roller units 32 are pivotally mounted centrally within the rectangular openings 31 and also centrally with respect to the thickness of the solid bushing 29 by means of mounting pins 33 screwed or fastened to the bushing. An annular retaining end ring 34, which is of substantially the same width radially as the thickness of the solid bushing 29 at each end of the composite bearing serves to retain the roller elements in operating position in their openings. The flexible roller units 32 are preferably equally spaced in circumferential disposition at each end of the solid bushing 28 such that the overall length of the bushing is substantially equivalent to the width of the bearing surface 19 in the fitting 30 and providing operating clearance space at the outer end for the washer 27.

The inner portion of the enlarged diameter 23 of the stub shaft is also the same diameter as portion 24 such that it makes a close fit with the inside diameter of the bored opening 20 in the enlarged end portion of the trunnion 9. The length of the opening 20 in the housing of the trunnion 9 is also such that the shoulder between the shaft portions 24 and 25 is spaced outwardly from the inner end of the bore 20, permitting the screwed end 22 to be made up tightly. Additional means for locking the shaft to the trunnion may be provided if desired.

In operation the normal partial rotation of the landing gear assembly, comprising the oleo strut 6, trunnion 9 and the braces 10, during retraction and extension is such that the relatively light bearing loads are taken up by the flexible roller units 32 making rolling contact both with the stub shaft 23 and the bore 19 in the hub 30, which serve as the outer and inner bearing races respectively. The solid bushing 29, in which these roller units are pivotally mounted is free to rotate both with respect to the shaft 23 and the hub 30, to be spaced equally from both of these elements while being carried in a floating manner. During the periods of these normal rotational loads the roller units 32 are adequate to carry the weight of the landing gear and other forces exerted upon it while the aircraft is not in contact with the ground and as the landing gear may be rotated about the axis A—A for either extension or retraction. At the same time the solid bushing or plain bearing 29 serves to interconnect and maintain the space relationship of the roller elements but does not come into contact with either the shaft portion 24 or the housing surface 19.

Assuming now that the landing gear is locked in the extended position, as shown in Figure 1, and the airplane to which it is attached makes a landing, the vertical impact is transmitted upwardly in the direction of the axis of the strut 6 and being transmitted to the portion 23 of the hinge pin as it bears against the internal bore 20 transmits a like vertical reaction to the surface 19 of the fixed frame fitting 30. Prior to the occurrence of this impact the relationship of the rollers and the bushing with respect to the shaft and its housing is shown in cross section in Figures 3 and 5. As the impact is transmitted, however, from the shaft portion 24 through the composite bearing 28 to the fitting 30 the rollers at the top of the composite bearing are depressed and deformed as shown in Figure 4 such that the load is transmitted directly from the shaft 23 by the adjacent segments of the solid bushing 29 and its portion intermediate the rollers to the fitting 30. When such impacts occur there is no relative rotative movement between the composite bearing and the surfaces serving as its races, all of the movement being taken up along the vertical transverse plane in the direction of the impact force. The several flexible helical rollers 32 which happen to be in the upper region of the composite bearing resiliently oppose the vertical force which brings the shaft 23 and the housing together and upon dissipation of this force restores the composite bearing to its normal position substantially centrally disposed between its inner and outer races. The load characteristics of the flexible roller units are preferably such that they maintain the solid bushing 29 spaced from both races while no loads other than the weight of the landing gear are required to be transmitted from the trunnion 19 to the fixed fitting 30.

The improved composite bearing is adapted for use in other portions of the landing gear or in other than landing gear structures and the benefits of this invention may be derived from other arrangements of its component parts to suit specific installation requirements. For example, the rollers 32 may be located within openings intermediate of the width of the solid bushing instead of at the ends as shown in the modification illustrated and if desired additional solid bushings may be provided in the form of inner and outer races fixed to the shaft and the housing respectively. In either case it will be noted that the present structure provides a substantially frictionless arrangement while there is relative rotation between the landing gear trunnion and the fixed journal fitting 30, and relatively high load capacity while the landing gear is fixed with respect to the aircraft and taxiing or landing loads are applied to it. Other modifications of the present invention which may occur to one skilled in the art after a reading of the foregoing specification and drawing, both as to general arrangement and detailed design, are all intended to fall within the scope and spirit of this invention as more clearly defined in the appended claims.

I claim:

1. In bearing construction, a rotatable member, a fixed member, a bearing assembly interposed between said members, said bearing comprising flexible roller and solid bushing means whereby resilient rolling contact is provided for normal rotative loads and fixed contact is provided for non-rotative loads in excess of said rotative loads, the said roller means being pivotally attached to and normally of greater dimension radially than said solid bushing member.

2. In bearing construction for a shaft and its housing subject to light rotative loads and heavier non-rotative loads, a unitary bearing disposed intermediate said shaft and housing comprising flexible roller units adapted for the journalling of said rotative loads and a solid bushing unit adapted for the transmission of said non-rotative loads between said shaft and housing, the said roller units being pivotally mounted upon said bushing unit such that their bearing surfaces clear said bushing unit in both its normal rotative load condition and deflected heavier non-rotative load condition.

3. In bearing construction, a rotatable member, a fixed member concentrically disposed with respect to said first member and a unitary annular bearing disposed between said members, said bearing comprising a solid annular bushing portion and flexible roller portions pivotally mounted upon said bushing portion whereby light rotative loads are journalled between said members upon said flexible rollers and radial loads in excess of said rotative loads are transmitted between said members by said annular bushing portion.

4. In bearing construction, a relatively rotatable member, a relatively fixed member co-axially disposed with respect to said first member, a bearing device interposed between said members comprising an annular bushing adapted to transmit non-rotative loads between said members and flexible roller elements pivotally mounted at the ends of said bushing adapted to provide resilient rolling contact for normal rotative loads.

5. In bearing construction, a relatively rotatable member, a relatively fixed member co-axially disposed with respect thereto, a unitary bearing assembly interposed within the annular space between said members, said bearing including a solid annular bushing being uninterrupted circumferentially at its central portion, flexible roller elements pivotally mounted upon the end portions of said annular bushing whereby said flexible rollers provide resilient rolling contact for normal rotative loads and fixed contact as provided by said annular bushing upon deflection of said flexible roller initiated by non-rotative loads in excess of said rotative loads.

6. In bearing construction, a relatively rotatable member, a relatively fixed member, co-axially disposed with respect to said first member, a unitary bushing assembly interposed within the annular space between said members, said bearing comprising a solid annular bushing element adapted to transmit excessive radial loads between said members in the non-rotative condition, the said bushing having a circumferentially uninterrupted central annular portion for said load transmission, said bushing being provided with radial and longitudinally extending openings circumferentially spaced at its end portions, flexible roller elements pivotally mounted upon said bushing for free rotation within said openings, said rollers being normally of greater diameter than the radial thickness of said solid bushing and adapted to have the rolling contact surfaces thereof clear the adjoining surfaces of the bushing in both the normal and deflected conditions of the rollers whereby said rollers provide resilient rolling contact between said members for normal rotative loads.

7. In a bearing subjected to both relatively light rotative loads and relatively heavy non-rotative loads, a unitary bearing assembly comprising a solid annular bushing of lesser thickness radially than the annular space between the adjacent bearing elements, said bushing having a circumferentially uninterrupted central portion and having its ends provided with radially and longitudinally extending openings of greater width circumferentially than the said radial dimension of said annular space, flexible roller elements pivotally mounted upon said bushing for free rotation within said openings, said rollers being normally of diameter greater than the radial thickness of said bushing whereby in the lightly loaded rotative condition said rollers contact the adjacent bearing elements and the bushing is freely rotatable in untouching relationship with said adjacent bearing elements, and in the heavily loaded non-rotative condition of said bearing certain of said rollers along the path of said heavier load are resiliently deflected, permitting the solid bushing to come into contact with the adjacent bearing elements for the transmission of said heavier load.

8. In a bearing construction subjected intermittently to relatively light rotative loads during normal operation and to relatively heavier radial loads under higher impacts, the said bearing including a bored element, a shaft element, an annular element normally concentrically and intermediately disposed with respect to said bored and shaft elements, roller elements rotatably carried by said annular element adapted to carry said light rotative loads and to position said annular element out of bearing contact with said bored and shaft elements during said normal operations, said roller elements being capable of deformation under higher radial loads whereby said annular element is adapted to transmit said higher radial loads directly between said bored and shaft elements.

9. A bearing structure subjected to relatively high radial loads and lighter rotational loads, comprising a relatively rotatable member, a relatively fixed member co-axially disposed with respect to said rotatable member, a plain annular element interposed between said rotatable and fixed elements adapted to transmit said radial loads directly between said rotatable and fixed members and flexible roller units rotatably carried by said annular element adapted to provide an anti-friction bearing when said radial loads do not exceed a predetermined magnitude.

10. In a bearing construction for a retractable landing gear including a relatively movable member having a ground engaging element associated therewith, a relatively fixed member and means to actuate said movable member from an extended to a retracted position, each of said members provided with bearing portions whereby the movable member is rotatably supported by said fixed member, said bearing construction comprising a cylindrical pin carried by one of said members, flexible roller elements normally in contact with said pin disposed within the bearing portions of said other member, a bushing element interposed between said pin and the bearing portion of the other of said members normally floatingly supported by said roller element, said bushing element adapted for the radial transmission of landing forces between said movable and fixed member bearing portions upon deformation of said flexible roller elements.

11. A bearing construction for a retractable landing gear for aircraft comprising a fixed supporting structure and a relatively movable landing member pivotally supported from said structure, said bearing construction including a plain bushing element rotatably retained between opposed portions of said supporting structure and said movable member adapted to transmit landing forces therebetween, and flexible roller units carried by said bushing elements adapted to permit anti-friction rotative movement under lesser radial forces during retraction and extension of said movable landing member.

CAREL T. TORRESEN.